US010260767B2

(12) United States Patent
Schuler et al.

(10) Patent No.: US 10,260,767 B2
(45) Date of Patent: Apr. 16, 2019

(54) THERMOSTAT HAVING CONFIGURABLE INTERFACE CONNECTIONS

(71) Applicant: Siemens Schweiz AG, Zürich (CH)

(72) Inventors: Michael S. Schuler, Lockport, IL (US); Pei Jin Li, Dongguan (CN); Zhan Jun Ding, Shenzhen (CN); William J. Fenske, Arlington Heights, IL (US)

(73) Assignee: Siemens Schweiz AG, Zurich (CH)

( * ) Notice: Subject to any disclaimer, the term of this patent is extended or adjusted under 35 U.S.C. 154(b) by 65 days.

(21) Appl. No.: 15/507,571

(22) PCT Filed: Nov. 3, 2014

(86) PCT No.: PCT/CN2014/090153
§ 371 (c)(1),
(2) Date: Feb. 28, 2017

(87) PCT Pub. No.: WO2016/070304
PCT Pub. Date: May 12, 2016

(65) Prior Publication Data
US 2017/0292729 A1  Oct. 12, 2017

(51) Int. Cl.
*F24F 11/00* (2018.01)
*G05D 23/19* (2006.01)
*F24F 11/30* (2018.01)
*G05B 15/02* (2006.01)

(52) U.S. Cl.
CPC ............. *F24F 11/30* (2018.01); *G05B 15/02* (2013.01); *G05D 23/1919* (2013.01); *G05B 2219/2614* (2013.01); *G05B 2219/2642* (2013.01)

(58) Field of Classification Search
CPC .. F24F 11/30; F24F 11/50; F24F 11/62; F24F 11/65; G05B 15/02; G05B 2219/2614; G05B 2219/2642; G05D 23/1919
USPC ........................................ 340/12.31; 700/276
See application file for complete search history.

(56) References Cited

U.S. PATENT DOCUMENTS

| 4,945,316 A | * | 7/1990 | Sebald | G05B 15/02 327/91 |
| 2001/0039190 A1 | * | 11/2001 | Bhatnagar | D06F 39/005 455/450 |
| 2010/0211224 A1 | * | 8/2010 | Keeling | F24D 19/1066 700/277 |
| 2011/0241916 A1 | * | 10/2011 | Fletcher | H03F 3/45475 341/122 |

(Continued)

FOREIGN PATENT DOCUMENTS

| CN | 1322975 A | 11/2001 |
| CN | 102231616 A | 11/2011 |
| CN | 103026626 A | 4/2013 |

OTHER PUBLICATIONS

EP Search Report dated May 18, 2018, for EP Application No. 14905319.1, 7 pages.

(Continued)

*Primary Examiner* — Edwin C Holloway, III

(57) ABSTRACT

An environmental control device (100), such as a thermostat, is disclosed. The environmental control device (100) has one or more terminals (222, 222a-222d) and a respective configurable interface circuit (102, 102a-102d, 300) coupled to each terminal for selectively configuring the terminal (222, 222a-222d) for a corresponding input or output connection to an HVAC system (14).

25 Claims, 8 Drawing Sheets

(56) References Cited

U.S. PATENT DOCUMENTS

2013/0304260 A1* 11/2013 Ramachandran .. G05B 19/0423
    700/276
2014/0047137 A1* 2/2014 Mathason .......... G05B 19/0423
    710/33

OTHER PUBLICATIONS

PCT International Search Report and Written Opinion of International Searching Authority dated Aug. 14, 2015 corresponding to PCT International Application No. PCT/CN2014/090153 filed Nov. 3, 2014.

* cited by examiner

FIG. 4

Table I
Processor Configuration Control Signals Defining States Corresponding To Configurable Interface Signal Input and Output Types

|  | CTRL3 (108c) | CTRL2 (108b) | CTRL1 (108a) | PWM (108d) | Interface Signal Type (Input or Output) |
|---|---|---|---|---|---|
| 402a | 0 | 0 | 0 | 1 | NTC Input Type 2 10KΩ |
| 402b | 0 | 0 | 1 | 0 | 0-10Vdc Input (100 KΩ) |
| 402cA | 0 | 1 | 0 | 0 | Digital Input (Binary, 24Vdc) FIG. 3A |
| 402cB | 0 | 1 | 0 | 1 | Digital Input (Binary, 24Vdc) FIG. 3B |
| 402d | 0 | 1 | 1 | 0 | N/A |
| 402e | 1 | 0 | 0 | 0 | N/A |
| 402f | 1 | 0 | 1 | f(Vi) | 0-10Vdc Output (1mA) |
| 402g | 1 | 1 | 0 | 0 | N/A |
| 402h | 1 | 1 | 1 | 0 | N/A |

FIG. 5

| | Table II | | | |
|---|---|---|---|---|
| | Interface Signal Types Associated With HVAC Component Types For Configuring Corresponding Terminal Connection | | | |
| HVAC Component Types | Interface Signal Type (Input or Output) | | | |
| | Digital Input | 0-10Vdc Output | NTC 10K Type 2 Input | 0-10Vdc Input |
| 0 = Not Used | | | | x |
| 1 = Indoor Temperature (Remote) | | | x | x |
| 2 = Indoor Temperature (Average) | | | x | x |
| 3 = Supply Temp | | | x | x |
| 4 = Return Temp | | | x | x |
| 5 = Outdoor Temp | | | x | x |
| 6 = Humidity (0-10V) | | | | x |
| 7 = CO2 (0-10V) | | | | x |
| 8 = Occupancy (DI) | x | | | |
| 9 = Fault | x | | | |
| A = Freezer/Cooler | | | x | x |
| B = Modulator (0-10V) | | x | | |

THERMOSTAT HAVING CONFIGURABLE INTERFACE CONNECTIONS

TECHNICAL FIELD

The present disclosure is directed, in general, to thermostats and, more particularly, to a thermostat having configurable interface connections for input and output to an HVAC system.

BACKGROUND

Thermostats and other temperature control devices are utilized in residential and commercial environments to control and regulate the environmental conditions within a structure. For example, a thermostat control device can regulate the temperature and airflow provided by a residential or commercial heating, ventilation and air-conditioning (HVAC) system. HVAC systems have various components or devices (e.g., different heating/cooling elements, fans, temperature and humidity sensors, etc) with varied input and output requirements. However, conventional thermostats often have fixed inputs and outputs for interfacing with a particular component of an HVAC system.

Certain conventional thermostats employ a configurable input terminal or a configurable output terminal that requires separate dedicated circuits for each input type or output type designed for the connection to the respective input terminal or output terminal (e.g., binary, 0-10 VDC, etc). After an input type or output type is selected for a configurable input terminal or output terminal of a conventional thermostat, only one of the separate dedicated circuits corresponding to the selected input type or output type is used. The remainder of the separate dedicated circuits remain unused during operation of the convention thermostat. Thus, such conventional thermostats with configurable input terminals and output terminals wastes real estate on a printed circuit card for each of the separate dedicated circuits, resulting in higher manufacturing costs.

SUMMARY

The disclosed embodiments address the problems presented above and provides a more cost efficient circuit for configuring a terminal connection to one of a plurality of inputs and/or output types. The disclosed embodiments generally relate to devices with configurable input and output terminals or connections. The disclosed embodiments more particularly relate to thermostats having configurable interface connections to one or more HVAC systems, where a single circuit may be configured to provide multiple arrangements having as least one active component for supporting a configurable interface connection and, in certain embodiments, support configuring the same connection for both an input type and an output type.

In one embodiment, a control device is provided that comprises an interface terminal and a configurable interface circuit. The configurable interface circuit has an interface connection coupled to the interface terminal, a plurality of switches, and a first plurality of configuration control inputs that collectively define a plurality of states. Each of a plurality of interface signal types is associated with a respective one of the states. Each configuration control input is coupled to at least one of the switches to control the activation of the at least one switch. The control device also includes a plurality of components coupled to the switches such that the switches define a current one of a plurality of component arrangements based on a corresponding one of the plurality of interface signal types associated with a current one of the states of the configuration control inputs. Each component arrangement has the interface connection to the respective interface terminal and includes at least one active component (such as an amplifier) from among the plurality of components.

Other embodiments are disclosed, and each of the embodiments can be used alone or together in combination. Additional features and advantages of the disclosed embodiments are described in, and will be apparent from, the following Detailed Description and the figures.

BRIEF DESCRIPTION OF THE FIGURES

FIG. 4 illustrates an exemplary table that identifies a plurality of configuration control inputs used to configure the configurable interface circuit in FIG. 3A and in FIG. 3B, where the configuration control inputs collectively define a plurality of states and each of the interface signal types that may be selected for configuring a given connection or terminal coupled to the configurable interface circuit is identified by a corresponding one of the states;

FIG. 5 illustrates another exemplary table that identifies a list of component types for an HVAC system in association with the signal interface type(s) that may be selected for configuring a given connection or terminal coupled to the configurable interface circuit based on the corresponding HVAC system component type;

DETAILED DESCRIPTION

The present disclosure generally relates to environmental monitoring and control systems and more particularly to an environmental control device (such as a "thermostat") configured to detect and control temperature conditions within a structure in association with an HVAC system and to provide the following advantages and technical solutions: a configurable interface circuit for selectively configuring a terminal or connection to one of a plurality of input and output interface signal types associated with a respective component of an HVAC System; such a configurable interface circuit providing flexibility to interface a given or single terminal of the control device as an input to or an output from most known HVAC System components while minimizing manufacturing cost and print circuit board size based on the number of components required for each of the component arrangements of the configurable interface circuit.

Figure 1:
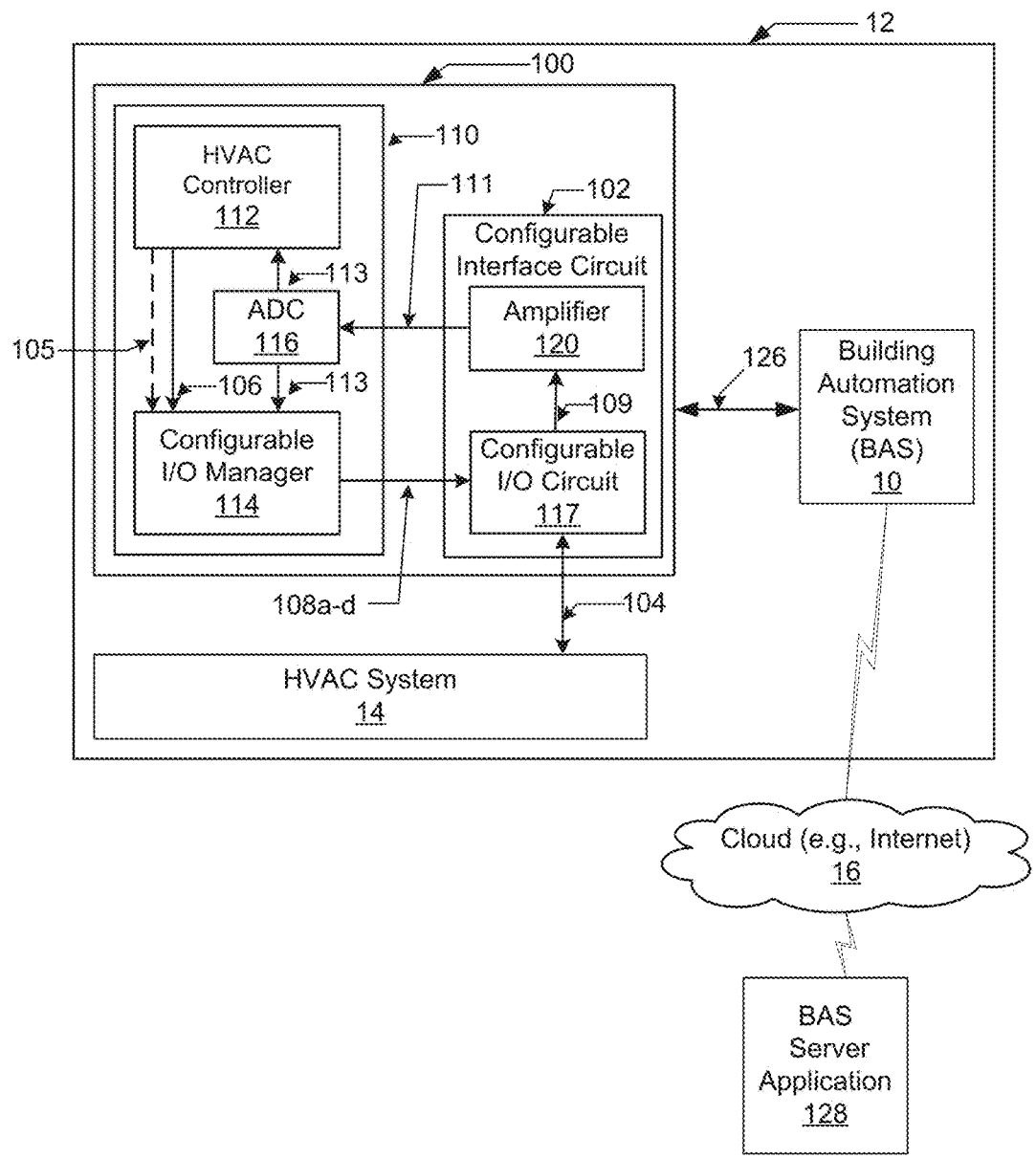
FIG. 1 illustrates a block diagram of an exemplary embodiment of an environmental control device having one or more connections to an HVAC system, where the environmental control device has a configurable interface circuit coupled to one of the connections to the HVAC system for selectively configuring the one connection to one of a plurality of input and/or output interface signal types.
Figure 2:
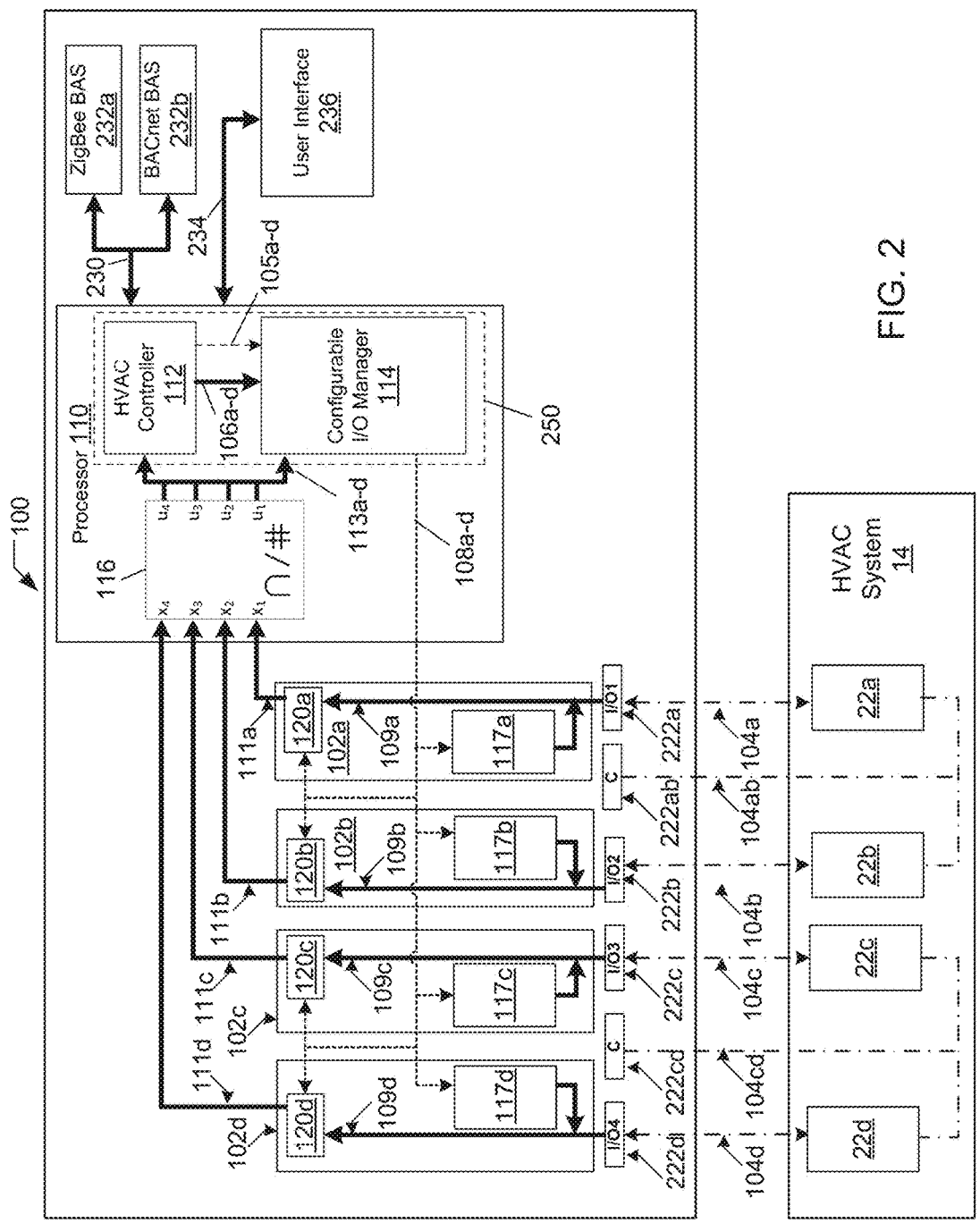
FIG. 2 illustrates an internal block diagram of the exemplary environmental control device shown in FIG. 1.

A block diagram of an exemplary embodiment of an environmental control device or thermostat 100 (also referenced as a "control device") is shown in FIG. 1 as employed in or with a building automation system (BAS) 10 consistent with the present invention for detecting and controlling temperature conditions within a building 12 in association with an HVAC system 14. An internal block diagram of the control device or thermostat 100 is shown in FIG. 2. As depicted in FIG. 1 and FIG. 2 and described in further detail herein, the thermostat 100 has a configurable interface circuit 102 coupled to one of the terminals or connections 222a-222d to the HVAC system 14 (reflected by i/o signal 104 in FIG. 1) for selectively configuring the one connection to one of a plurality of input and/or output interface signal types.

Continuing with FIG. 1 and FIG. 2, the thermostat 100 includes a processor 110 or other controller that executes machine-readable instructions stored in internal or external memory or accessed via the network 126. Examples of a processor 110 may include a microprocessor having one or more cores, microcontroller, application-specific integrated circuit (ASIC), digital signal processor, digital logic devices configured to execute as a state machine, analog circuits configured to execute as a state machine, or a combination of the above. The processor 110 is typically electronically coupled to memory (e.g., 250 as shown in FIG. 2), a network interface and other parts of the thermostat 100 via one or more address and data buses. Internal or external memory employed in the processor 110 may be random access memory, SDRAM, DIMM, or other types of digital storage capable of read/write access.

The processor 110 stores instructions (e.g., in memory 250 as shown in FIG. 2) that comprise an HVAC Controller logic or application 112 (also referenced as "HVAC Controller") and an Configurable Input and Output Manager logic or application 114 (also referenced as "Configurable I/O Manager"). As described in further detail herein, the HVAC Controller 112 is configured to receive and store one or more user selectable configuration parameters 105 for configuring, via the Configurable I/O Manager 114 one or more connections or terminals (e.g. 222a, 222b, 222c and 222d in FIG. 2) to be an input type or output type corresponding to a component 22a, 22b, 22c, or 22d of the HVAC System 14. When the configuration parameters 105 reflect that an identified connection or terminal 222a, 222b, 222c and 222d is to be (or has been) configured as an output type, the HVAC Controller 112 may also receive a set point value 106 to associate with the identified connection or terminal 222a, 222b, 222c and 222d when configured as an output type. The HVAC Controller 112 communicates the parameters 105 and set points 106 to the Configurable I/O Manager. In one implementation, the HVAC Controller 112 communicates the parameters 105 and set points 106 to the Configurable I/O Manager 114 by storing the parameters 105 and set points 106 in memory 250 at locations known to the Configurable I/O Manager 114. For example, a user may login to an "Installer Menu" presented (via a User Interface 236 described herein) and set parameters assigned to terminal I/O 222a for a voltage output as shown in Table II (FIG. 5) causing Configurable I/O Manager 114 to setup control signals 108a-d to values 402f as shown in Table I (FIG. 4). A first of the parameters 105 may be set to B=Modulator (0-10V), a second parameter may be set to forward or reverse to describe if the modulator will raise or lower output in response to a setpoint, a third parameter may be set to LO value represented by 0 Vdc and a fourth parameter may be set to HI value that represents 10 Vdc such as 10 for 10V or 100 for 100%.

As described in further detail herein, the Configurable I/O Manager 114 generates and outputs a group of configuration control signals 108a-d for each Configurable I/O Circuit 117 and associated Amplifier Circuit 120 of the Configurable Interface Circiuit 102 based on the parameters 105 identified to configure the connection or terminal controlled by the respective Configurable I/O Circuit 117 and associated Amplifier Circuit 120. In particular, a set or plurality of the configuration control signals 108a-c identify a respective state to the Configurable Interface Circuit 102 for configuring components of the Configurable I/O Circuit 117 and Amplifier Circuit 120 to define a corresponding component arrangement for the interface signal type associated with the identified state. The configuration control signals 108a-c identify a plurality of states that corresponding to different interface signal types that correspond to one or more input types and at least one output type. The Configurable Interface Circuit 102 configures a given terminal 222a, 222b, 222c and 222d for the input or output interface signal type for connection to a respective component 22a-22d of the HVAC System 14 based on the configuration control signals 108a-c and another configuration control signal 108d that supplies either a first D.C. voltage (e.g., 3.3 VDC) for one input interface signal type (e.g., for input connection to a "negative temperature coefficient" or NTC thermistor type temperature sensor), a second D.C. voltage (e.g., 0 VDC) for another input interface signal type that does not source input from the Configurable I/O Circuit 117a-d (e.g., an analog voltage input or a digital input) or a pulse width modulated signal having an amplitude between the first and second D.C. voltages and an adjustable duty cycle to provide an output voltage within a pre-defined range such as 0-10 VDC).

Once a terminal 222a, 222b, 222c and 222d has been configured for a respective input or output interface signal type by the Configurable I/O Circuit 117, the Amplifier Circuit 120 may employ one or more of the configuration control signals 108a-108d to scale and normalize the input signal or feedback signal 109 present on the given terminal 222a, 222b, 222c and 222d to generate and output a corresponding input or feedback signal 111 for processing by an analog to digital converter (ADC) 116. The ADC 116 converts the input or feedback signal 111 to a multi-bit digital signal 113 that be provided to or stored in memory 250 for access by both the HVAC Controller 112 and the Configurable I/O Manager 114 for further processing. In one implementation, the ADC 116 is a 12-bit ADC employed in the processor 110. However, the ADC 116 may 116 may be implemented as a separate semiconductor ADC component having more or less bits in the digital signal 113.

In one implementation, the thermostat 100 includes a network 126 connection (which may include wired or wireless branches) to the BAS 10 for signal communication to a BAS server application 128, which may be employed in the BAS 10 or be hosted on a remote server connected to the BAS 10 via a cloud communication network 16 such as the Internet. In this implementation, the HVAC Controller 112 as employed in the thermostat 100 may receive parameters 105 remotely from the BAS server application 128 (e.g., from a user or installer operating the BAS server application 128). In addition, the HVAC Controller 112 may provide input or feedback signals 109 or other related information to the BAS server application 128 for remote processing.

In the implementation shown in FIG. 2, the thermostat 100 has four Configurable Interface Circuits 102a-102d that include a respective Configurable I/O Circuit 117a-d and associated Amplifier Circuit 120a-d for configuring a respective terminal or connection 222a-d for an input or output to a corresponding component 22a-22d of the HVAC System 14. Each of the Configurable Interface Circuit 102a-102d receives a respective group of configuration control signals 108a-d from the Configurable I/O Manager 114 based on the parameters 105 identified by a user or installer for configuring a corresponding terminal or connection 222a-222d. Although four terminals 222a-222d and corresponding number of Configurable Interface Circuits 102a-102d are shown in FIG. 2, more or less Configurable Interface Circuits 102a-102d may be employed in a control device or thermostat 100 to configure one or more terminals 222a-222d in accordance with the present invention.

As shown in the implementation shown in FIG. 2, the thermostat 100 may also include one or more common, neutral return or earth ground terminals 222ab and 222cd for connecting to a respective common, neutral return or earth ground connection of the HVAC System components 22a-22d.

The thermostat 100 may further include a user interface 236 coupled to the processor 110 via a standard bus 234 or other bi-directional parallel or serial communication protocol connection. The user interface 236 may be a standard touch screen or combination of a keyboard and display, or other input/output device. When executing instructions or programming software or firmware contained in a setup or configuration application (or part of the HVAC Controller 112 or the Configurable I/O Manager 114) stored in memory 250 of the processor 110, the processor 110 may generate and display a screen via the user interface 236 that includes a user selectable settings input to enable a user (such as a technician or thermostat installer) to identify system parameters 105 to the processor 110 pertaining to the HVAC system components 22a, 22b, 22c, and 22d for configuring the connections or terminals 222a, 222b, 222c and 222d via a corresponding Configurable Interface Circuit 102 and configuration control signals 108a-d generated and supplied by the Configurable I/O Manager 114 based on the respective identified parameters 105.

The thermostat 100 may also include a wireless network input/output device 232a that may employ a standard wireless communication protocol, such as ZigBee©, WiFi®, Bluetooth® or other wireless network protocol, for enabling wireless signal communication via network 126 to the BAS 10. In addition, the thermostat 100 may include a wired network input/output device 232b that may employ a standard network communication protocol, such as BACnet™ or other network protocol, for enabling signal communication via network 126 to the BAS 10. Each network input/output device 232a and 232b are coupled to the processor 110 via a standard bus 230 or other bi-directional parallel or serial communication protocol connection.

Figure 3A:
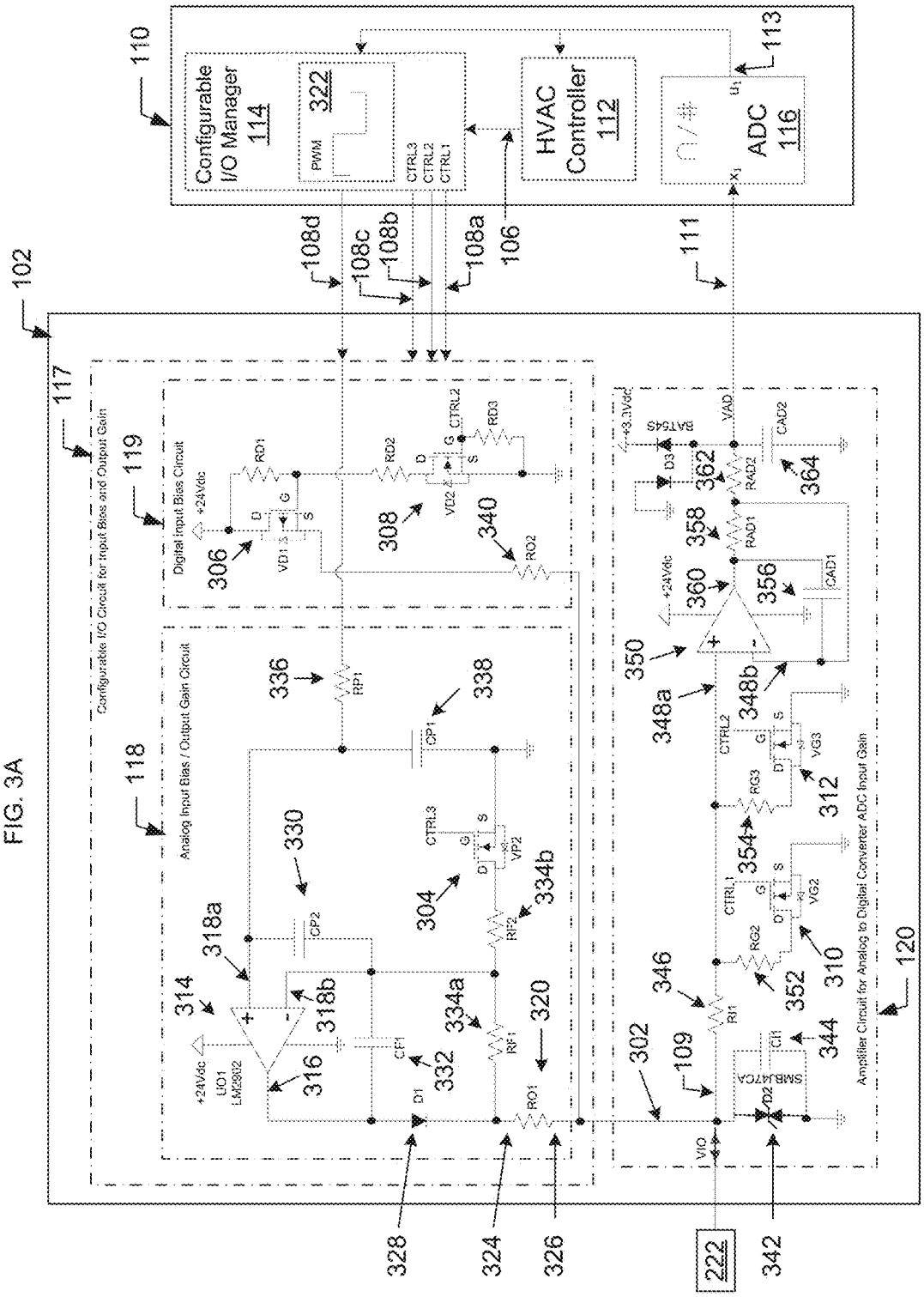
FIG. 3A illustrates a schematic diagram of an exemplary configurable interface circuit that may be employed in the environmental control device in accordance with the present invention.

Turning to FIG. 3A, a schematic diagram of an exemplary Configurable Interface Circuit 102 that may be employed in the environmental control device or thermostat 100 is shown. To avoid obscuring aspects of the present invention, only one Configurable Interface Circuit 102 is described in detail in FIG. 3A as coupled between the processor 110 and terminal 222. However, the terminal 222 refers to any of the terminals 222a, 222b, 222c or 222d and the Configuration Interface Circuit 102 refers to any of the corresponding Configuration Interface Circuits 102a, 102b, 102c or 102d.

As shown in FIG. 3A, the Configurable Interface Circuit 117 employed in the environmental control device or thermostat 100 includes a Configurable I/O Circuit 117 and an associated Amplifier Circuit 120. In the embodiment shown in FIG. 3A, the Configurable I/O Circuit 117 may include an analog input bias & output gain circuit 118 and a digital input bias circuit 119. In an alternative embodiment, the digital input bias circuit 119 may be incorporated into the analog input bias & output gain circuit 118 such as described in reference to FIG. 3B herein.

Figure 3B:
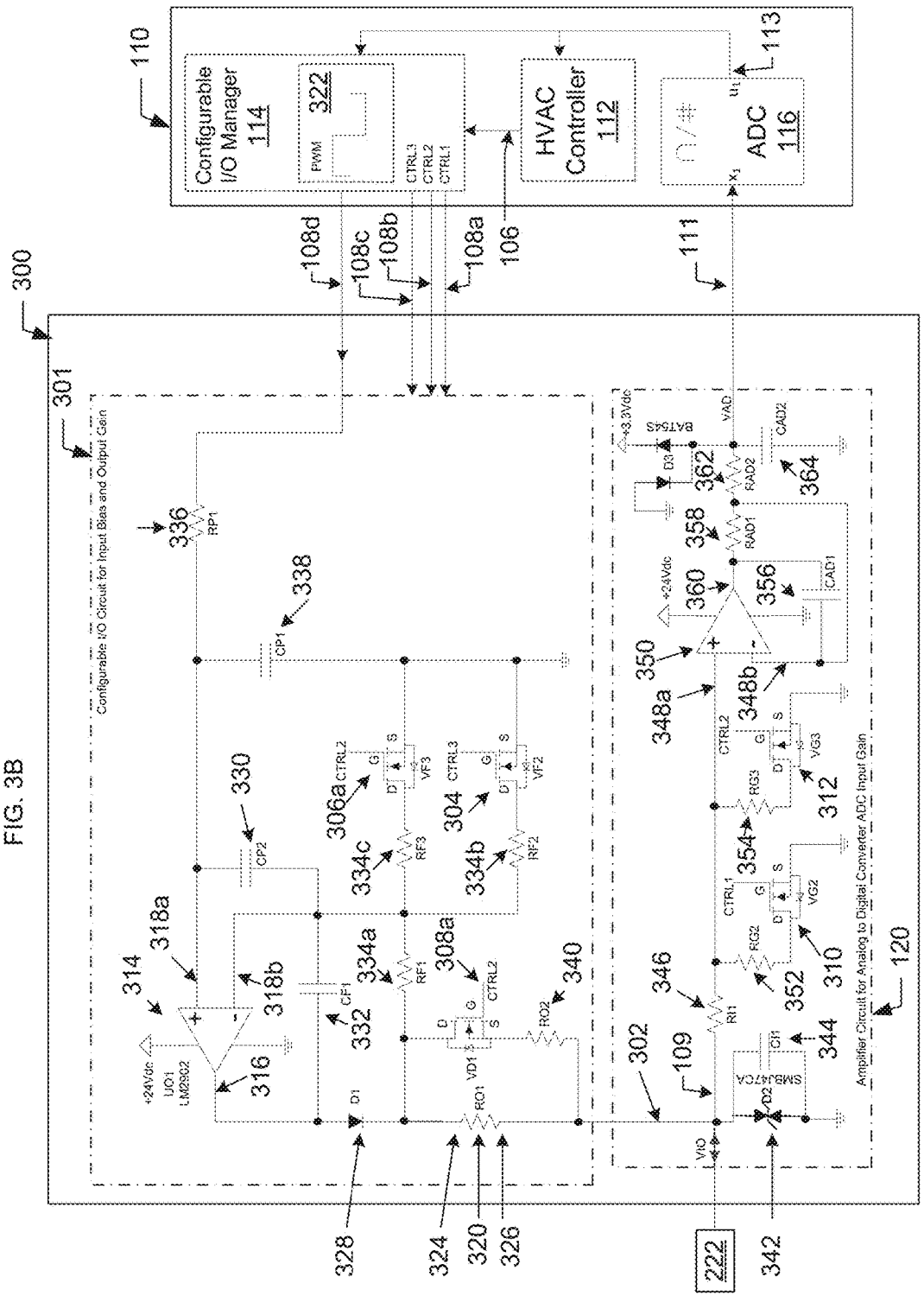
FIG. 3B illustrates a schematic diagram of another exemplary configurable interface circuit that may be employed in the environmental control device in accordance with the present invention.

In either embodiment, the Configurable Interface Circuit 117 includes an interface connection 302 (which also may be referenced as "VIO" in FIG. 3A) that is coupled to the interface terminal 222. The Configurable Interface Circuit 117 also includes a plurality of switches 304, 306, 308, 310, and 312 and a first plurality of configuration control inputs ("CNTRL3," "CTRL2," and "CTRL1" corresponding to the configuration control signals 108a-108c in FIG. 3A) that collectively define a plurality of states 402a-402h as reflected in the exemplary Table I in FIG. 4. As shown in Table I, each of the interface signal types (input or output) that may be selected for configuring a given connection or terminal 222 coupled to the Configurable Interface Circuit 102 is identified by a corresponding one of the states 402a, 402b, 402c (i.e., 402cA as depicted in FIG. 3A and 402cB as depicted in FIG. 3B), and 402f. The Configurable I/O Manager 114 is able to recognize that not every state defined by the configuration control inputs or signals 108a-108c (such as states 402d, 402e, 402g and 402f) needs to identify an interface signal type.

As described in further detail herein, the user, technician or installer of the thermostat identifies parameters 105 to the Configurable I/O Manager 114 (via the HVAC Controller 112 and User Interface 236) that includes an HVAC Component Type identification as reflected in Table II of FIG. 5 that is associated with the HVAC Component 22a, 22b, 22c or 22d to be connected to the corresponding terminal 222 of the Thermostat 100. In the example shown in Table II of FIG. 5, the HVAC Component Type may include: a remote indoor temperature sensor input, an indoor temperature average sensed input (e.g., from a HVAC component 22 having multiple temperature sensors), an air supply temperature sensor input, an air return temperature sensor input, an outdoor temperature sensor input, a humidity sensor input, a carbon dioxide ($CO_2$) sensor input, an occupancy sensor input, a fault detection input, a freezer/cooler input, or an analog output (e.g., 0 to 10 VDC). The HVAC Controller 112 and the Configurable I/O Manager are each able to recognize that certain HVAC Component Types may be associated with two or more interface signal types. For example, when the HVAC Component Type identified by a user, technician or installer is for a remote indoor temperature sensor input, the HVAC Controller 112 or the Configurable I/O Manager 114 is able to: (1) recognize that the identified remote indoor temperature sensor input may be an NTC Thermistor Type 2 Sensor Input or a remote indoor temperature sensor that provides a 0-10 VDC input based on the sensed temperature, and (2) prompt the user, technician or installer via the User Interface 236 to select one of these two interface signal types. The Configurable I/O Manager 114 accesses the selected interface signal type as one of the identified system parameters 105 (stored or provided by the HVAC Controller) that is associated with a respective terminal or connection 222a-222d in order to generate the corresponding configuration control inputs or signals 108a-d to reflect the corresponding state (e.g., 402a) for prompting the Configurable Interface Circuit. 102 to configure the respective terminal 222 for the input or output type reflected by the interface signal type corresponding to the state reflected by the configuration control inputs or signals 108a-108c.

Returning to FIG. 3A, each configuration control input 108a-108c is coupled to at least one of the switches 304, 306, 308, 310, and 312 to control the activation of the given switch. The switches 304, 306, 308, 310, and 312 shown in FIG. 3A are FET transistors. However, other type of switches such as relays or DIP switches may be used. As further explained herein, the Configurable Interface Circuit 102 includes a plurality of components coupled to the switches 304, 306, 308, 310, and 312 such that the switches define a current one of a plurality of component arrangements based on a corresponding one of the plurality of interface signal types associated with a current one of the states 402a, 402b, 402c (i.e., 402cA as depicted in FIG. 3A and 402cB as depicted in FIG. 3B), or 402f identified by the configuration control inputs or signals 108a-108c. Each component arrangement of the Configurable Interface Circuit 102 has the interface connection 302 to the terminal 222 and at least one active component from among the plurality of components. One advantage of the present invention is that the Configurable Interface Circuit is able to use multiple common components in the different arrangements to configure a respective terminal 222 for a corresponding interface signal input or output type.

In the implementation shown in FIG. 3A, the one active component is the amplifier 314 that has an output 316 coupled to the interface connection 302. The amplifier 314 is used in each arrangement of the Configurable Interface Circuit 102 to provide (in combination with other components of the current arrangement) either of two different analog input bias reference signals, an output gain signal or a digital input bias reference signal in accordance with the interface signal type identified by the current state 402a, 402b, 402c (i.e., 402cA as depicted in FIG. 3A and 402cB as depicted in FIG. 3B), or 402f of the configuration control inputs or signals 108a-108c.

The components of the Configurable Interface Circuit also include a first resistor 320 coupled in series between the output 316 of the active component 314 and the interface connection 302 to the terminal 222. In each component arrangement of the Configurable Interface Circuit, the first resistor 320 is directly connected to the interface connection 302 to regulate the voltage presented on the interface connection 302 in relationship with the analog input bias reference signal, the output gain, or digital input bias reference signal output by the amplifier 314 based on the current state 402a, 402b, 402c or 402f of the configuration control inputs or signals 108a-108c as described in further detail herein.

In addition to certain components of the Amplifier Circuit 120, other components of the Configurable Interface Circuit 102 that may be common to each of the component arrangements include a first capacitor 330, and a feedback filter comprised of a second capacitor 332 and a second resistor 334a coupled in parallel. The first capacitor 330 is coupled between the first and second inputs 318a and 318b of the amplifier 314 that is defined to provide noise cancellation of inputs to the amplifier 314. The second capacitor 332 and the second resistor 334a are each coupled between the output 316 and the second input 318b of the amplifier to define the feedback filter for the amplifier 314. Another common component for each component arrangement may be a diode 328 coupled between the output 316 of the amplifier and the first resistor 324 to inhibit current from external sources connected to the terminal 222 from reaching or damaging the amplifier 314.

Other components of the Configurable Interface Circuit are only included in certain of the component arrangements based on the current state 402a, 402b, 402c (i.e., 402cA as depicted in FIG. 3A and 402cB as depicted in FIG. 3B), or 402f of the configuration control inputs or signals 108a-108c. For example, when the configuration control inputs 108a-108c are set to the state 402f to identify an interface signal output type corresponding to a fourth component configuration as described herein, a third resistor 334b is selectively coupled via switch 304 between ground and one end of the second resistor 334a to define an output gain of the amplifier 314. Otherwise, the third resistor 334b is decoupled from ground when the first switch 304 is deactivated based on an active state (e.g., logic "1" for active high switch types) of the configuration control input 108c, inhibiting the third resistor 334b from being included in any other component arrangement of the Configurable Interface Circuit 102 where the configuration control input 108c is not in the active state.

The Configurable Interface Circuit 102 also includes another configuration control input or signal 108d that is different than the first plurality of configuration control inputs 108a-c and not required to specify the state 402a, 402b, 402c (i.e., 402cA as depicted in FIG. 3A and 402cB as depicted in FIG. 3B), or 402f of the configuration control inputs or signals 108a-108c for identifying the current interface signal type. The other configuration control input or signal 108d is coupled between the first input 318a of the amplifier 314 and a signal generator 322 employed in and controlled by the Configurable I/O Manager 114 for generating a first voltage, a second voltage or a pulse width modulated (PWM) signal having an amplitude that varies between the first and second voltages and an adjustable duty cycle to provide an output voltage within a pre-defined range such as 0-10 VDC in accordance with the current state 402a, 402b, 402c (i.e., 402cA as depicted in FIG. 3A and 402cB as depicted in FIG. 3B), or 402f of the configuration control inputs or signals 108a-108c as reflected in Table I of FIG. 4.

Certain of the components of the Configurable Interface Circuit 102 may be common to each of the component arrangements defined by the states 402a, 402b, 402c (i.e., 402cA as depicted in FIG. 3A and 402cB as depicted in FIG. 3B), or 402f of the configuration control inputs or signals 108a-108c but may function differently depending on the component arrangement. For example, each of the component arrangements of the Configurable Interface Circuit 102 include a fourth resistor 336 and a third capacitor 338. The fourth resistor 336 is coupled between the first input 318a of the amplifier 314 and the other configuration control input 108d that is connected to the signal generator 322 of the Configurable I/O Manager 114. The third capacitor 338 has one end connected to the first input 318a of the amplifier 314 and another end coupled to ground and the first switch 304. The resistor 336 and the capacitor 338 form a low pass filter for signals presented on the first input of the amplifier 314. When the state configuration control inputs 108a-108c are set to the state 402f to identify an interface signal output type within a second analog voltage range (e.g., 0 VDC to 10 VDC), the resistor 336 and the capacitor 338 that define the low pass filter for the amplifier 114 are configured to rectify the duty cycle of the PWM signal sent by the signal generator 322 on the configuration control input 108d. Note, in the implementation shown in FIGS. 3-4, the state 402f is shown as logic "101" in Table I of FIG. 4 and referenced herein as the fourth state identifying interface signal types. However, other states may be used to identify the same or different interface signal types.

When the configuration control inputs 108a-108c identify a first state 402a, the switches 304, 306, 308, 310, and 312 are controlled in accordance with the first state 402a to define a first of the component arrangements that associates the interface connection 302 with a first of the interface signal types (e.g., "NTC Input Type 2 10 KΩ" associated with state 402a in Table I of FIG. 4). The first interface signal type of "NTC Input Type 2 10 KΩ" identifies a first input type having a first analog voltage range from 0 VDC to 3.3 VDC. When the Configurable Interface Circuit is configured for the first component arrangement, the first resistor 320 varies a voltage present on the interface connection 320 in association with a resistive load connected to the interface terminal 222 that corresponds to the respective NTC thermistor sensor component 22a, 22b, 22c or 22d of the HVAC System 14. When in the first state 402a, the Configurable I/O Manager 114 causes the signal generator 322 to generate and output the high end (e.g., 3.3 VDC) of the first analog voltage range (e.g., 0 VDC to 3.3 VDC) on the configuration control input 108d, which is presented on the first input 318a of the amplifier after filtering by the low pass filter defined by the resistor 336 and capacitor 338. In the implementation shown in FIG. 3A, the amplifier 314 is configured in the first component arrangement to present the high end (e.g., 3.3 VDC) of the first analog voltage range (e.g., 0 VDC to 3.3 VDC) to the one end 324 of the first resistor 320 that is coupled to the output 316 of the amplifier 314. When the high end (e.g., 3.3 VDC) of the first analog voltage range is present on the one end 324 of the first resistor 320, the other end 326 of the first resistor 320 that is coupled to the interface connection 302 is allowed to vary the voltage drop across the first resistor 320 within the first analog voltage range based on the resistive load that is received from or present on the terminal 222 from the respective NTC thermistor sensor component 22a, 22b, 22c or 22d of the HVAC System 14.

In the example shown in FIGS. 3-5, the first state 402a specifies that the configuration control inputs 108a-108c are set to a logic "0" to deactivate or open each of the switches 304, 306, 308, 310, and 312 that are activated by a respective one of the configuration control inputs 108a-108c. In the first state 402a, when the first switch 304 is deactivated, the third resistor 334b is decoupled so that the first component arrangement is inhibited from including the third resistor 334b and the amplifier 114 has unity gain output of 3.3 VDC or the high end of the first voltage range 0 to 3.3. VDC that is associated with the interface signal type of "NTC Input Type 2 10 KΩ".

Continuing with FIG. 3A, the third switch 308 has an active high actuation input that is coupled to the configuration control input 108b. The output of the third switch 308 is coupled to the actuation input of the second switch 306 (which is activated by an active low signal). When the second switch 306 is activated via the third switch 308, the second switch 306a couples a digital input bias source voltage (e.g., 24 VDC in FIG. 3A) to the interface connection 302 via a resistor 340 that drops the digital input bias voltage source voltage to the digital input bias voltage level (e.g., 22 VDC) for identifying an active high digital input signal (e.g., logic "1") as the input signal 109 when the terminal 222 is connected to a digital output of an HVAC System component 22a, 22b, 22c or 22d.

In the first state 204a, the configuration control input 108b is set by the Configurable I/O Manager 114 to non-active state or level (e.g., logic "0") to deactivate the third switch 308 in FIG. 3A, which in turn deactivates the second switch 306 in FIG. 3A. In the embodiment shown in FIG. 3A, when the second switch 306 is deactivated, the resistor 340 is decoupled from the digital input bias source voltage (e.g., 24 VDC) and is inhibited from being included as a component of the first component arrangement of the Configurable Interface Circuit 102. Thus, when the configuration control inputs 108a-108c are set to the first state 204a and the high end (e.g., 3.3 VDC) of the first analog voltage range is present on the one end 324 of the first resistor 320, the other end 326 of the first resistor 320 that is coupled to the interface connection 302 is allowed to vary the voltage drop across the first resistor 320 within the first analog voltage range (without signal or bias interface from the resistor 340 of the digital input bias circuit 119) based on the resistive load that is received from or present on the terminal 222 from the respective NTC thermistor sensor component 22a, 22b, 22c or 22d of the HVAC System 14.

The Amplifier Circuit 120 includes a Zener diode 342 and input filter capacitor 344 connected to the interface connection 302 and the terminal 222 to provide surge suppression and noise filtering for any input or feedback signal 109 received via the terminal or the interface connection 302. The Amplifier Circuit 120 may also include a high impedance resistor 346 and an input amplifier 350. The high impedance resistor 346 is coupled between a junction of the terminal 222 and the interface connection 302 and a first input 348a of the input amplifier 350. In one implementation, the high impedance resistor 346 has a resistance of 100K ohms or higher to inhibit high currents from damaging the Amplifier Circuit 120. Each of the Zener diode 342, the input filter capacitor 344, the high impedance resistor 346 and the input amplifier 350 may be common components of each component arrangement of the Configurable Interface Circuit 102. However, other components of the Amplifier Circuit 120 as employed in the Configurable Interface Circuit 102 are only included in certain of the component arrangements based on the current state 402a, 402b, 402c or 402f of the configuration control inputs or signals 108a-108c.

In particular, the Amplifier Circuit includes a fifth resistor 352 coupled between the input 348a of the input amplifier 350 and the fourth switch 310. The fourth switch 310 is activated by the configuration control input 108a which is active high (e.g., logic "1") when the configuration control inputs 108a-108c identifies either the second state 204b (e.g., "001" in FIG. 4) that identifies a second interface signal type corresponding to a 0-10 VDC input or the fourth state 204f (e.g., "101" in FIG. 4) that identifies an interface signal type corresponding to a 0-10 VDC output.

The Amplifier Circuit also includes a sixth resistor 354 coupled between the input 348a of the input amplifier 350 and the fifth switch 312. The fifth switch 312 is activated by the configuration control input 108b which is active high (e.g., logic "1") when the configuration control inputs 108a-108c identify the third state 204c (e.g., "010" in FIG. 4) that identifies a third interface signal type corresponding to a digital input (e.g., with digital input bias voltage level of 22 VDC for identifying an active high digital input signal or logic "1" and a low digital input bias voltage level of 0 VDC for identifying an active low digital input signal or logic "0").

In the first state 204a, when the configuration control inputs 108a and 108b are both set by the Configurable I/O Manager 114 to non-active state or level (e.g., logic "0"), both the fourth switch 310 and the fifth switch 312 of the Amplifier Circuit 120 are deactivated so that one end of each of resistors 352 and 354 is or remains decoupled (from connecting to ground) so that these resistors 352 and 354 are inhibited from being including in the first component arrangement of the Configurable Interface Circuit 102. As a result, with the switches 310 and 312 deactivated or open and the resistors 352 and 354 effectively removed from the first component arrangement, the input amplifier 350 has a unity gain for the first component arrangement in which the terminal 222 is configured to have an interface signal input corresponding to an NTC thermistor.

As shown in FIG. 3A, the Amplifier Circuit 120 may further include a capacitor 356 and a resistor 358 where each is coupled to the second input 348b of the input amplifier 350 and the output 360 of the input amplifier 350 to configure the input amplifier 350 to be a voltage follower component. In one embodiment, the Amplifier Circuit 120 may include another resistor 362 and another capacitor 364 coupled between the output 360 of the input amplifier 350 (or voltage follower) and the input to the ADC 116 (as referenced by the input or feedback signal 111 in FIG. 3A) to define a corresponding filter for isolating input impedance from the ADC 116. A diode circuit (referenced as D3 in FIG. 3A) may be connected to the output of the Amplifier Circuit (as referenced by the input or feedback signal 111 in FIG. 3A) to clamp or remove voltage transients on the input or feedback signal 111 that are out of compliance with design positive and negative amplitude threshold limits for the signal 111.

For completeness, the second through fourth component arrangements of the Configurable Interface Circuit 102 will be described in further detail. When the configuration control inputs 108a-108c are set by the Configurable I/O Manager 114 to identify the second state 402b, the switches 304, 306, 308, 310, and 312 are controlled in accordance with the second state 402b to define a second of the component arrangements that associates the interface connection 302 with a second of the interface signal types. The second interface signal type identifies a second input type having a second analog voltage range from 0 VDC to 10 VDC. The second analog voltage range has a high end (e.g., 10 VDC) that is greater than the high end (e.g., 3.3 VDC of the first analog voltage range associated with the first interface signal type (e.g., NTC Thermistor input) identified by the first state 402a of the configuration control inputs 108a-108c.

In the example shown in FIGS. 3-5, the second state 402a specifies that the configuration control inputs 108c-108a are set to a logic "001" (respectively) to deactivate or open each of the switches 304, 306, 308, and 312 that are activated by a respective one of the configuration control inputs 108c and 108b and activate the fourth switch 310. In the second state 402b, when the first switch 304 is deactivated, the third resistor 334b is decoupled so that the second component arrangement is inhibited from including the third resistor 334b and the amplifier 114 has unity gain output of 0 VDC, which is the low end of the second analog voltage range of 0 to 10 VDC that is associated with the interface signal type corresponding to an analog input that is within this second voltage range.

When in the second state 402b, the Configurable I/O Manager 114 causes the signal generator 322 to generate and output the low end (e.g., 0 VDC) of the second analog voltage range (e.g., 0 VDC to 10 VDC) on the configuration control input 108d, which is presented on the first input 318a of the amplifier after filtering by the low pass filter defined by the resistor 336 and capacitor 338. In the second component arrangement of the Configurable Interface Circuit 102, when the second voltage corresponding to the low end (e.g., 0 VDC) of the second analog voltage range is present on the first input of the amplifier 314 and the one end of the third resistor 334b is decoupled by the deactivation of the first switch 304, the amplifier 314 generates an output signal corresponding to the second voltage (e.g., 0 VDC) that is presented to the one end 324 of the first resistor that is coupled to the output 314 of the amplifier 314, enabling the voltage present on the interface terminal to be presented as an analog input voltage (e.g., input signal 109) to the Amplifier Circuit 120.

In the second state 204b, the digital input bias circuit 319 is again effectively inhibited from biasing or interfering with the signal or voltage present on the interface connection 302. In particular, during the second state 204b, the configuration control input 108b is set by the Configurable I/O Manager 114 to a non-active state or level (e.g., logic "0") to deactivate the third switch 308 which in turn deactivates the second switch 306. When the second switch 304 is deactivated, the resistor 340 is decoupled from the digital input bias source voltage (e.g., 24 VDC) and is inhibited from being included as a component of the second component arrangement of the Configurable Interface Circuit 102. Thus, when the configuration control inputs 108a-108c are set to the second state 204b and the low end (e.g., 0 VDC) of the second analog voltage range is present on the one end 324 of the first resistor 320 that is coupled to the output of the amplifier 314, the other end 326 of the first resistor 320 that is coupled to the interface connection 302 is allowed to vary with the voltage present on the terminal 222 (without signal or bias interface from the resistor 340 of the digital input bias circuit 119) as an analog voltage input from the respective component 22a, 22b, 22c or 22d of the HVAC System 14.

In the second state 204b, the Amplifier Circuit 120 has an input gain bias that is configured as part of the second component arrangement of the Configurable Interface Circuit 120 to correspond to the interface signal type of an analog voltage within the second analog voltage range of 0 VDC to 10 VDC. In the implementation shown in FIG. 3A, during the second state 204b, the configuration control input 108a is set by the Configurable I/O Manager 114 to an active state or level (e.g., logic "1") activating the fourth switch 310 to cause the fifth resistor 352 to be connected between ground and one end of the high impedance resistor 346 such that the high impedance resistor 346 and the fifth resistor 352 form a voltage divider or input gain corresponding to equation (1) below:

Gain=Resistance of resistor 352/(resistance of resistor 346+resistance of resistor 352)   (1)

In one implementation, the resistance of the high impedance resistor 346 and the resistance of the fifth resistor 352 are selected to correspond to the ratio of the high end of the second analog voltage range (e.g., 10 VDC) to the high voltage of a digital logic "1" for the processor 110 (e.g., 3.3 VDC). For example, when the high impedance resistor 352 has a resistance of 100K ohm, the fifth resistor may have a resistance of approximately 43K ohm. As long as the identified ratio is maintained, the high impedance resistor and the fifth resistor may have other corresponding resistance values.

During the second state 204b, the fifth switch 312 of the Amplifier Circuit 120 is deactivated so that one end this resistor 354 is or remains decoupled (from connecting to ground) so that the sixth resistor 354 is inhibited from being included in the second component arrangement of the Configurable Interface Circuit 102.

Continuing with FIG. 3A, when the configuration control inputs 108a-108c are set by the Configurable I/O Manager 114 to identify the third state 402c (i.e., 402cA as depicted in FIG. 3A and 402cB as depicted in FIG. 3B), the switches 304, 306, 308, 310, and 312 are controlled in accordance with the third state 402b to define a third of the component arrangements that associates the interface connection 302 with a third of the interface signal types. The third interface signal type identifies a third input type corresponding to a digital input (e.g., with digital input bias voltage level of 22 VDC for identifying an active high digital input signal or logic "1" and a low digital input bias voltage level of 0 VDC for identifying an active low digital input signal or logic "0"). In the example shown in FIGS. 3-5, the third state 402c specifies that the configuration control inputs 108c-108a are set to a logic "010" (respectively) to deactivate or open each of the switches 304 and 310 that are activated by a respective one of the configuration control inputs 108c and 108a and activate the switches 306, 308 and 312 that are activated (directly or indirectly) by the configuration control input 108b. In the third state 402c, when the first switch 304 is deactivated, the third resistor 334b is decoupled so that the third component arrangement is inhibited from including the third resistor 334b so that the amplifier 114 has unity gain output.

When in the third state 402cA, the Configurable I/O Manager 114 causes the signal generator 322 to generate and output a first digital biasing voltage that corresponds to the low end (e.g., 0 VDC) of the second analog voltage range (e.g., 0 VDC to 10 VDC) on the configuration control input 108d. This first digital biasing voltage (e.g., 0 VDC) is presented on the first input 318a of the amplifier after filtering by the low pass filter defined by the resistor 336 and capacitor 338. In the third component arrangement of the Configurable Interface Circuit 102, when the first digital biasing voltage (e.g., 0 VDC) is present on the first input of the amplifier 314 and the one end of the third resistor 334b is decoupled by the deactivation of the first switch 304, the amplifier 314 generates an output signal corresponding to the first digital biasing voltage (e.g., 0 VDC) that is presented to the one end 324 of the first resistor 320 that is coupled to the output 314 of the amplifier 314. As further described herein, during the third state 204c, the digital input bias circuit 119 is configured to present a second digital input bias voltage (e.g., 22 VDC) to the other end 326 of the first resistor 320, enabling a digital input voltage (e.g., input signal 109) to the Amplifier Circuit 120 based on the voltage present on the terminal 222 (where the respective HVAC System component 22a, 22b, 22c, or 22d may present an open circuit at the terminal 222 for a logic "1" or a ground or 0 VDC for a logic "0").

In the embodiment shown in FIG. 3A for the digital input bias circuit 119, in the third state 204c, the configuration control input 108b is set by the Configurable I/O Manager 114 to an active state or level (e.g., logic "1") to activate the third switch 308 which in turn activates the second switch 306. When the second switch 306 is activated, the resistor 340 is coupled between the digital input bias source voltage (e.g., 24 VDC) and the second end 326 of the first resistor 320 (and the interface connection 302) to present the second digital input bias voltage (e.g., 22 VDC) to the interface connection 302, enabling a digital input (e.g., input signal 109) to be input to the Amplifier Circuit 120 based on the voltage present on the terminal 222 (e.g., based on open or ground connection presented on the terminal 222 by the respective HVAC System component 22a, 22b, 22c or 22d). In this embodiment, the resistor 340 is included as a component of the third component arrangement of the Configurable Interface Circuit 102.

During the third state 204c, the Amplifier Circuit 120 has an input gain bias that is configured as part of the third component arrangement of the Configurable Interface Circuit 120 to correspond to the interface signal type of a digital input where the input signal 109 varies between 0 VDC (to reflect a logic "0") and second digital input bias voltage (e.g., 22 VDC that reflects a logic "1"). In the implementation shown in FIG. 3A, during the third state 204c, the configuration control input 108a is set by the Configurable I/O Manager 114 to a non-active state or level (e.g., logic "0") deactivating the fourth switch 310 so that one end of the fifth resistor 352 is or remains decoupled (from connecting to ground) so that the fifth resistor 352 is inhibited from being included in the third component arrangement of the Configurable Interface Circuit 102. During the third state 204c, the Configurable I/O Manager 114 also sets the configuration control input 108b to an active state or level (e.g., logic "1") to activate the fifth switch 312, causing the sixth resistor 354 to be connected between ground and one end of the high impedance resistor 346 such that the high impedance resistor 346 and the sixth resistor 354 form a voltage divider or input gain corresponding to equation (2) below:

Gain=Resistance of resistor 354/(resistance of resistor 346+resistance of resistor 354)   (2)

In one implementation, the resistance of the high impedance resistor 346 and the resistance of the sixth resistor 354 are selected to correspond to the ratio of the second digital input bias voltage output of the digital input bias circuit (e.g., 22 VDC) to the high voltage of a digital logic "1" for the processor 110 (e.g., 3.3 VDC). For example, when the high impedance resistor 346 has a resistance of 100K ohm, the sixth resistor may have a resistance of approximately 15K ohm. As long as the identified ratio is maintained, the high impedance resistor and the sixth resistor may have other corresponding resistance values.

Returning to FIG. 3A, when the configuration control inputs 108a-108c are set by the Configurable I/O Manager 114 to identify the fourth state 402f, the switches 304, 306, 308, 310, and 312 are controlled in accordance with the fourth state 402b to define a fourth of the component arrangements that associates the interface connection 302 with a fourth of the interface signal types. As shown in Table I in FIG. 4, the fourth interface signal type identified by the fourth state 402f is an output type where the output is within a second analog voltage range (e.g., 0 VDC to 10 VDC). In the example shown in FIGS. 3-5, the fourth state 402f specifies that the configuration control inputs 108c-108a are set to a logic "101" (respectively) to deactivate or open each of the switches 306, 308 and 312 that are activated by the configuration control inputs 108b and activate the switches 304 and 310 that are activated by the configuration control inputs 108c and 108a, respectively.

When in the fourth state 402f, the Configurable I/O Manager 114 causes the signal generator 322 to generate and output a pulse width modulation (PWM) signal having amplitude that varies from a first voltage and a second voltage on the configuration control input 108d and having an adjustable duty cycle to cause the Configurable I/O Circuit 117 in the fourth component arrangement to provide an output voltage on the terminal 222 within a pre-defined range such as 0-10 VDC. The first voltage of the PWM signal may be the same voltage (e.g., 3.3 VDC) that is supplied by the signal generator 322 during a first state 402a to provide the high end of the first analog voltage range of 0 VDC to 3.3 VDC for the first input interface signal type of an NTC thermistor sensor that is identified by the first state 402a as described herein. The second voltage of the PWM signal may be the same voltage (e.g., 0 VDC) that is supplied by the signal generator 322 during the second state 402b and the third state 402cA to provide a bias voltage to the amplifier 314 consistent with the second input interface signal type of an analog input and the third input interface type of a digital input as described herein. During the fourth state 204f, the PWM signal is presented to the low pass filter defined by the resistor 336 and capacitor 338. This low pass filter rectifies the current duty cycle of the PWM signal to generate a corresponding rectified D.C. voltage to the first input 318a of the amplifier 314 that is a percentage of the first voltage (e.g., 3.3 VDC).

In the fourth component arrangement of the Configurable Interface Circuit 102, when the rectified D.C. voltage is present on the first input of the amplifier 314, the third resistor 334b is coupled by the activation of the first switch 304 between ground and one end of the second resistor 334a to form a voltage divider that defines an output gain for the amplifier 314 during the fourth state 204f corresponding to equation (3) below:

$$\text{Output Gain}=(\text{resistance of resistor 334a/resistance of resistor 334b}+1)*\text{rectified D.C. voltage} \quad (3)$$

Where the rectified D.C. voltage corresponds to a percentage of the first voltage (e.g., 3.3 VDC) of the PWM signal and the current duty cycle of the PWM signal.

In one implementation, the resistance of the second resistor 334a and the resistance of the third resistor 334b are selected to correspond to the ratio of high voltage of a digital logic "1" for the processor 110 (e.g., 3.3 VDC) and the high end of the second analog voltage range (e.g., 10 VDC) that may be output as the analog output on the interface connection 302 and terminal 222 during the fourth state 204f. For example, when the second resistor 334a has a resistance of 100K ohm, the third resistor 334b may have a resistance of approximately 43K ohm. As long as the identified ratio is maintained, the second resistor and the third resistor may have other corresponding resistance values.

As described herein, the amplifier 314 generates an output signal corresponding based on the output gain specified in equation (3) that is presented to the one end 324 of the first resistor that is coupled to the output 314 of the amplifier 314, enabling a corresponding output voltage within the voltage range of 0 VDC to 10 VDC to be output on the interface terminal 222 and to be presented as feedback input (e.g., input signal 109) to the Amplifier Circuit 120.

In the fourth state 204f, the digital input bias circuit 319 is again effectively inhibited from biasing or interfering with the signal or voltage present on the interface connection 302. In particular, during the fourth state 204f, the configuration control input 108b is set by the Configurable I/O Manager 114 to a non-active state or level (e.g., logic "0") to deactivate the third switch 308 which in turn deactivates the second switch 306. When the second switch 306 is deactivated, the resistor 340 is decoupled from the digital input bias source voltage (e.g., 24 VDC) and is inhibited from being included as a component of the fourth component arrangement of the Configurable Interface Circuit 102 for an output interface signal type.

In the fourth state 204f, the Amplifier Circuit 120 has an input gain bias (also referenced as a feedback gain bias when the configuration control inputs 108a-108c identify an interface signal type that is an output type) that is configured as part of the fourth component arrangement of the Configurable Interface Circuit 120 to correspond to the interface signal type of an output analog voltage within the second analog voltage range of 0 VDC to 10 VDC. In the implementation shown in FIG. 3A, during the fourth state 204f, the configuration control input 108a is set by the Configurable I/O Manager 114 to a non-active state or level (e.g., logic "0") causing the fourth switch 310 of the Amplifier Circuit 120 to be deactivated such that one end the resistor 352 is or remains decoupled (from connecting to ground) so that the fifth resistor 352 is inhibited from being included in the fourth component arrangement of the Configurable Interface Circuit 102. During the fourth state 204f, the Configurable I/O Manager 114 also sets the configuration control input 102b to an active state or level (e.g., logic "1") activating the fifth switch 312 to cause the sixth resistor 352 to be connected between ground and one end of the high impedance resistor 346 such that the high impedance resistor 346 and the sixth resistor 352 form a voltage divider or input gain corresponding to equation (4) below:

$$\text{Gain}=\text{Resistance of resistor 352/(resistance of resistor 346+resistance of resistor 352)} \quad (4)$$

In one implementation, the resistance of the high impedance resistor 346 and the resistance of the sixth resistor 354 are selected to correspond to the ratio of the high end of the second analog voltage range (e.g., 10 VDC) to the high voltage of a digital logic "1" for the processor 110 (e.g., 3.3 VDC) consistent with gain identified in equation (1) for input analog interface signal type corresponding to the second state 204b. For example, when the high impedance resistor 346 has a resistance of 100K ohm, the sixth resistor may have a resistance of approximately 15K ohm. As long as the identified ratio is maintained, the high impedance resistor and the sixth resistor may have other corresponding resistance values.

FIG. 3B illustrates a schematic diagram of another exemplary Configurable Interface Circuit 300 that may be employed in the environmental control device or thermostat 100 as an alternative to the Configurable Interface Circuit 102. In the embodiment shown for Configurable Interface Circuit, the digital input bias circuit 119 is incorporated into the analog input bias & output gain circuit 118 to form the Configurable I/O Circuit 301. The Configurable Interface Circuit 300 is consistent with the Configurable Interface Circuit 102 and the Configurable I/O Circuit 301 is consistent with the Configurable I/O Circuit 117 except for the differences described below. In this implementation, the state 402cA of the configuration control inputs 108a-108c for the third component arrangement of the Configurable Interface Circuit 300 corresponds is the same as the state 402cB of the third component arrangement of the Configurable Interface Circuit 102 (e.g., "010" in FIG. 4). However, when the Configurable I/O Circuit 301 is employed, the Configurable I/O Manager 114 causes the signal generator 322 to provide the digital input bias source voltage factor (e.g., 3.3 VDC) directly on other configuration control input 108d for biasing the amplifier 114 to provide a digital input bias source voltage (e.g., approximately 24 VDC) during the third state 204cB.

In the embodiment shown in FIG. 3B, both the second switch 306a and the third switch 308a have an active high actuation input that is coupled to the configuration control input 108b (i.e., "CTRL2"). In this embodiment, the second switch 306a is coupled between a seventh resistor 334c and ground, and the third switch 308a is coupled between the output 316 of the amplifier 314 (via Diode 328) and the end of the resistor 340 that is connected to the interface connection 302. In this embodiment of the Configurable I/O Circuit 301, during the third state 204cB that identifies that the terminal 222 is to be configured for a digital input interface signal type, the resistor 340 is selectively coupled via the third switch 308a to be in parallel with the first resistor 320, and the resistor 334c is selectively coupled via the second switch 306a to between ground and one end of the second resistor 334a to define a digital input bias voltage gain for the amplifier 314 corresponding to equation (5) below:

$$\text{Gain} = (\text{Resistance of resistor } 334a/\text{resistance of resistor } 334c+1)*\text{fixed dc voltage from PWM signal on configuration control input } 108d \text{ (e.g., 3.3 VDC)} \quad (5)$$

In one implementation, the resistance of the resistor 334a and the resistance of the resistor 334c are selected to correspond to provide a gain multiplication of the digital input bias source voltage factor (e.g., 3.3 VDC) supplied on the configuration control input 108d to the amplifier 314 that results in a digital input bias (e.g., 24 VDC) output from the amplifier 314 to the combined resistance of the parallel resistors 320 and 340 during the third state 204cB. The combined resistance of resistors 320 and 340 enables the Configurable Interface Circuit 300 when configured to be in the third component arrangement as described above to source more current (e.g. up to 8 milliamps) for receiving a digital input on the terminal 222 during the third state 204cB In this third component arrangement of the Configurable Interface Circuit 300, the amplifier 314 supplies the digital input bias voltage (e.g., 24 VDC) to the other end 326 of the first resistor 320, enabling a digital input voltage (e.g., input signal 109) to the Amplifier Circuit 120 based on the voltage present on the terminal 222 (where the respective HVAC System component 22a, 22b, 22c, or 22d may present an open circuit at the terminal 222 for a logic "1" or a ground or 0 VDC for a logic "0").

During other states 204a, 204b, or 204f, the resistor 340 is decoupled from the output 316 of the amplifier 314 when the third switch 308a is deactivated based on an active state (e.g., logic "1" for active high switch types) of the configuration control input 108b, inhibiting the resistor 340 from being included in any other component arrangement of the Configurable Interface Circuit 102 where the configuration control input 108b is not in the active state. Likewise the resistor 334c is decoupled from ground when the second switch 306a is deactivated based on an active state of the configuration control input 108b, inhibiting the resistor 334c from being included in any other component arrangement of the Configurable Interface Circuit 102 where the configuration control input 108b is not in the active state.

Figure 6:
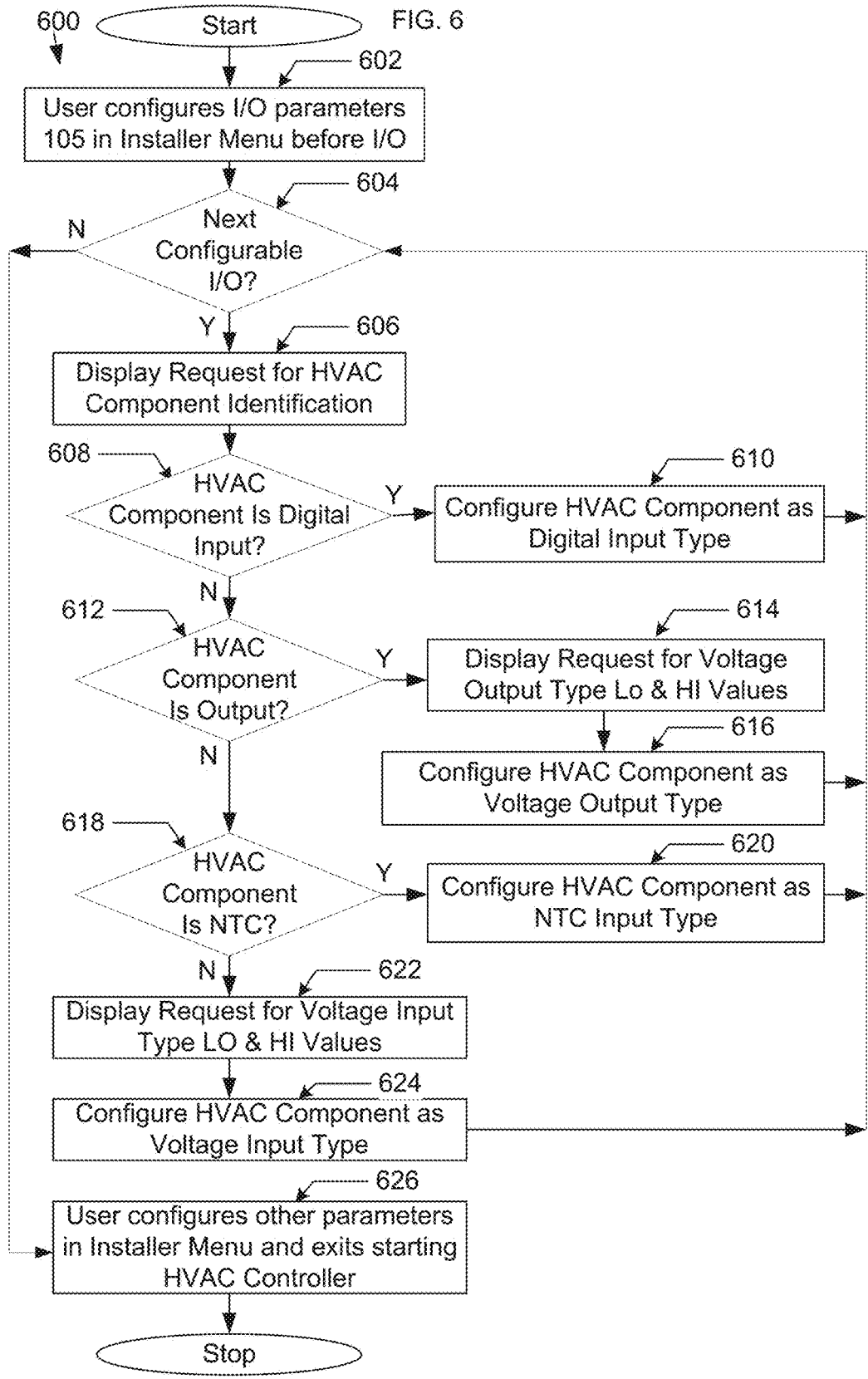
FIG. 6 illustrates a flow diagram of a process performed in the environmental control device for selectively configuring a connection or terminal coupled to the configurable interface circuit shown in FIG. 1.

Turning to FIG. 6, a flow diagram of a process 600 performed in the environmental control device 100 for selectively configuring a connection or terminal 222 coupled to the configurable interface circuit 102 based on one or more parameters identified by a user or installer corresponding to the signal interface type associated with the respective HVAC System component 22a, 22b, 22c or 22d to be connected to the respective terminal 222. The process 600 may be performed by the thermostat 100. For example, the process may be performed by the processor 110 under the control of the Configurable I/O Manager 114 and the HVAC Controller 112.

In step 602, the processor 110 displays a first installation menu via the User Interface 236 to prompt the user or installer to identify a terminal 222a, 222b, 222c or 222d to be configured for connection to a respective component 22a, 22b, 22c or 22d of the HVAC System 14. In step 604, the processor 110 next determines whether the user or installer has selected or identified a terminal 222a, 222b, 222c or 222d to be configured for input or output. If it is determined that a terminal has been selected or identified for input or output, the processor 110 displays via the User Interface 236 a request for the user or installer to select an identification of the HVAC System component 22a, 22b, 22c or 22d to be connected to the selected or identified terminal 222 (step 606). In one embodiment, the processor 110 may display each of the HVAC Component Types identified in Table II of FIG. 5 as user selectable options on a display of the User Interface 236.

In step 608, the processor 110 determines whether the selected identification of the HVAC System component corresponds to a digital input type. If it is determined that the selected HVAC System component identification corresponds to a digital input type, the processor 110 configures the current identified terminal 22 as an interface signal type corresponding to a digital input type (step 610). In one embodiment, the HVAC Controller 112 via the processor 110 stores the HVAC System component identification and the digital input type identification in association with the current terminal 222 identification as parameters 105 for the Configurable I/O Manager 114 to reference to configure the Configurable Interface Circuit 102 associated with the respective terminal 222. In one embodiment, once the terminal 222 to be configured is associated with a digital input type, the Configurable I/O Manager 114 may set the configuration control inputs 108a-108c for the respective Configurable Interface Circuit 102 to correspond to a third state 204c and provide on the configuration control input 108d a first digital biasing voltage that corresponds to the low end (e.g., 0 VDC) of the second analog voltage range (e.g., 0 VDC to 10 VDC) to cause the respective Configurable Interface Circuit 102 to configure the current terminal 222 for the interface signal input type corresponding to a digital input type as identified in Table I of FIG. 4. After completing step 610, the processor 110 may continue processing at step 604 for any other terminals to be configured.

If it is determined that the selected HVAC System component identification does not correspond to a digital input type, the processor 110 determines whether the selected identification of the HVAC System component corresponds to an output type. (step 612). If it is determined that the selected HVAC System component identification corresponds to an output type, the processor 110 displays via the User Interface 236 a request for the user or installer to identify a first voltage for a low end of the analog output voltage range to associate with the interface signal output type associated with the selected HVAC System component and a second voltage for a high end of the analog output voltage range (step 614). The processor 110 then configures the current identified terminal 22 as an interface signal output type based on the identified analog output voltage range (step 616). In one embodiment, the HVAC Controller 112 via the processor 110 stores the HVAC System component identification, the interface signal output type identification, and the identified first and second voltages that define the analog output voltage range in association with the current terminal 222 identification as parameters 105 for the Configurable I/O Manager 114 to reference to configure the Configurable Interface Circuit 102 associated with the respective terminal 222. In one embodiment, once the terminal 222 to be configured is associated with an interface signal output type, the Configurable I/O Manager 114 may set the configuration control inputs 108a-108c for the respective Configurable Interface Circuit 102 to correspond to a fourth state 204f as identified in Table I of FIG. 4 and to generate a PWM signal on the other configuration control input 108d with an amplitude varying between the identified first and second voltages of the analog output voltage range store as parameters 105 for the respective terminal 222 to be configured. After completing step 616, the processor 110 may continue processing at step 604 for any other terminals to be configured.

If it is determined that the selected HVAC System component identification does not correspond to an output type in step 612, the processor 110 determines whether the selected identification of the HVAC System component corresponds to an NTC thermistor input type. (step 618). If it is determined that the selected HVAC System component identification corresponds to an NTC thermistor input type, the processor 110 configures the current identified terminal 22 as an interface signal input type corresponding to an NTC thermistor input type (step 620). In one embodiment, the HVAC Controller 112 via the processor 110 stores the HVAC System component identification and the interface signal input type identification corresponding to the NTC thermistor input type in association with the current terminal 222 identification as parameters 105 for the Configurable I/O Manager 114 to reference to configure the Configurable Interface Circuit 102 associated with the respective terminal 222. In one embodiment, once the terminal 222 to be configured is associated with the identified interface signal input type, the Configurable I/O Manager 114 may set the configuration control inputs 108a-108c for the respective Configurable Interface Circuit 102 to correspond to a first state 204a as identified in Table I of FIG. 4 and provide the high end (e.g., 3.3 VDC) of the first analog voltage range (e.g., 0 VDC to 3.3 VDC) on the configuration control input 108d to cause the respective Configurable Interface Circuit 102 to configure the current terminal 222 for the interface signal input type corresponding to the NTC Thermistor input type. After completing step 620, the processor 110 may continue processing at step 604 for any other terminals to be configured.

If it is determined that the selected HVAC System component identification does not correspond to an NTC thermistor input type in step 618, the processor 110 recognizes that the selected identification of the HVAC System component corresponds to an analog input type having a selectable analog input voltage range and displays via the User Interface 236 a request for the user or installer to identify a first voltage for a low end of the analog input voltage range to associate with the interface signal analog input type associated with the selected HVAC System component and a second voltage for a high end of the same analog input voltage range (step 622). The processor 110 then configures the current identified terminal 22 as an interface signal input type corresponding to the identified analog input type based on the identified analog input voltage range (step 624). In one embodiment, the HVAC Controller 112 via the processor 110 stores the HVAC System component identification, the interface signal input type identification corresponding to the analog input type, and the identified analog input voltage range in association with the current terminal 222 identification as parameters 105 for the Configurable I/O Manager 114 to reference to configure the Configurable Interface Circuit 102 associated with the respective terminal 222. In one embodiment, once the terminal 222 to be configured is associated with the identified interface signal input type, the Configurable I/O Manager 114 may set the configuration control inputs 108a-108c for the respective Configurable Interface Circuit 102 to correspond to a second state 204b as identified in Table I of FIG. 4 and provide the high end (e.g., 3.3 VDC) of the identified analog input voltage range on the configuration control input 108d to cause the respective Configurable Interface Circuit 102 to configure the current terminal 222 for the interface signal input type corresponding to the identified analog input type. After completing step 624, the processor 110 may continue processing at step 604 for any other terminals to be configured.

If it is determined in step 604 that the user or installer has finished selecting terminal 222a, 222b, 222c or 222d to be configured for input or output or not used, the processor 110 may continue accepting other parameter input from the user (step 626). After completing step 626, the processor 110 may end process 600 and initiate process 700 as depicted in FIG. 7.

Figure 7:
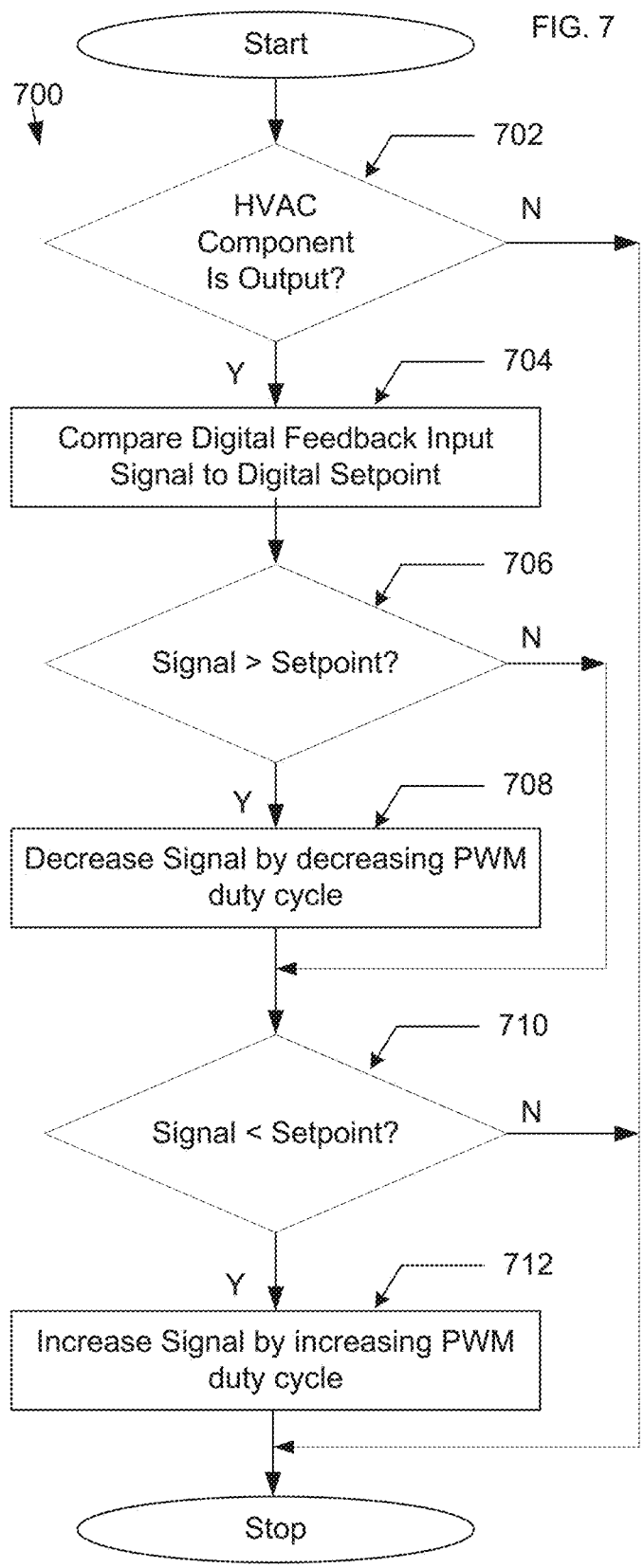
FIG. 7 illustrates a flow diagram of a process performed in the environmental control device when the connection or terminal coupled to the configurable interface circuit is configured as an output type.

Turning to FIG. 7, a flow diagram is shown of a process 700 performed in the environmental control device 100 when the connection or terminal coupled to the configurable interface circuit 102 is configured as an output type. The process 700 may be performed by the thermostat 100. For example, the process may be performed by the processor 110 under the control of the Configurable I/O Manager 114. Initially, the processor 110 determines whether the HVAC Component connected to the current terminal 222 has an interface signal output type (step 702) such as identified for the fourth state 204f in Table I of FIG. 4. For example, the Configurable I/O Manager 114 under the control of the processor 110 may retrieve the parameters 105 associated with the current terminal 222 to identify that the current terminal 222 is configured for an interface signal output type in accordance with state 420f of the configuration control inputs 108a-108c. If its is determined that the HVAC Component connected to the current terminal 222 has an interface signal output type, then the processor 110 compares the digital feedback input signal corresponding to the input signal 109 after processing by the ADC 116 to a pre-determined digital setpoint value for the HVAC Component connected to the current terminal 222 (step 704). For example, the HVAC Component 22 may be a humidifier controller of the HVAC System 14 and the pre-determined digital setpoint may be a humidity setpoint that corresponds to a voltage between 0 VDC and 10 VDC. The pre-determined digital setpoint in this example may be received from a user via a humidity input on the User Interface 236 that is received by the HVAC Controller 112 and stored as one of the parameters 105 associated with the respective configurable I/O terminal 222 that is connected to the HVAC System component that is a humidifier controller. The Configurable I/O Manager 114 may then have access to the pre-determined digital humidity setpoint value when accessing the stored parameters 105 for the terminal 222 and associated HVAC Component output that is currently being processed in the performance of the process 700. As part of step 706, the Configurable I/O Manager 114 may convert the pre-determined digital humidity setpoint value as provided by the user (e.g., absolute humidity, relative humidity, or specific humidity) to a corresponding digital voltage value for comparison to the digital feedback input signal corresponding to the input signal 109.

Next, the processor 110 under the control of the Configurable I/O Manager 114 determines if the digital feedback input signal corresponding to the input signal 109 is greater than the pre-determined digital setpoint value for the HVAC Component connected to the current terminal 222 (step 706). If it is determined that the digital feedback input signal is not greater than the pre-determined digital setpoint value, then the processor 110 continues processing at step 710.

If it is determined that the digital feedback input signal is greater than the pre-determined digital setpoint value, then the processor 110 under the control of the Configurable I/O Manager 114 causes the signal generator 322 to decrease the PWM signal duty cycle on the configuration control input 108d to the Configurable Interface Circuit 102 associated with the current terminal 222 being processed (step 708). This Configurable Interface Circuit 102 was previously configured by the Configurable I/O Manager 114 to be in the fourth component arrangement based setting the configuration control inputs to this Configurable Interface Circuit 102 to correspond to the fourth state 204f associated with an Interface Signal Type that is an analog voltage output type. When the PWM signal with the decreased duty cycle is presented by the signal generator 322 on the configuration control input 108d of Configurable Interface Circuit 102, the low pass filter defined by the resistor 336 and capacitor 338 of the Configurable Interface Circuit 102 generates a lower rectified D.C. voltage to the input 318a of the amplifier 314, resulting in a corresponding lower analog voltage signal on the interface connection 302 and the terminal 222 connected to the HVAC component as previously described herein.

In step 710, the processor 110 determines if the digital feedback input signal is less than the pre-determined digital setpoint value. If it is determined that the digital feedback input signal is less than the pre-determined digital setpoint value, then the processor 110 under the control of the Configurable I/O Manager 114 causes the signal generator 322 to increase the PWM signal duty cycle on the configuration control input 108d to the Configurable Interface Circuit 102 associated with the current terminal 222 being processed (step 712). When the PWM signal with the decreased duty cycle is presented by the signal generator 322 on the configuration control input 108d of Configurable Interface Circuit 102, the low pass filter defined by the resistor 336 and capacitor 338 of the Configurable Interface Circuit 102 generates a higher rectified D.C. voltage to the input 318a of the amplifier 314, resulting in a corresponding higher analog voltage signal on the interface connection 302 and the terminal 222 connected to the HVAC component as previously described herein.

If it is determined that the HVAC Component connected to the current terminal 222 does not have an interface signal output type in step 702 or if it is determined that the digital feedback input signal is not less than the pre-determined digital setpoint value in step 710 or after completing step 712, the processor 110 ends processing for this cycle of process 700.

It will be understood and appreciated that one or more of the processes and process steps described in connection with FIGS. 6 and 7 may be performed by hardware alone or a combination of hardware and software employed in the thermostat 100. The software may reside in a memory internal or external to the processor 110 as depicted in the thermostat 100 of FIGS. 1 and 2. The software residing in memory may include an ordered listing of executable instructions for implementing logical functions (that is, "logic" that may be implemented in digital form such as digital circuitry or source code or in analog form such as an analog source such as an analog electrical, sound, or video signal). The instructions may be executed within the processor 110, which may include, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example thermostats or environmental control devices described in this application may be implemented in a variety of configurations and operate as hardware/software components in a single unit, or in separate combination of hardware/software units.

The executable instructions that comprise the HVAC Controller 112, the Configurable I/O Manager 114 and other applications described herein may be implemented as a single computer program product having instructions stored there in which, when executed by the processor 110 or other processing module of the thermostat 100 direct the thermostat to carry out the instructions. The computer program product may be selectively embodied in any non-transitory computer readable storage medium for use by or in connection with the processor 110 or other processing module of the thermostat 100 that may selectively fetch the instructions from the computer readable storage medium and execute the instructions. In the context of this document, computer-readable storage medium is any non-transitory means that may store the computer program product for use by or in connection with the processor 110 or other processing module of the thermostat 100. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read-only memory such as, for example, Flash memory (electronic); a compact disc memory such as, for example, CD-ROM, CD-R, CD-RW (optical); and digital versatile disc memory, i.e., DVD (optical). Note that the non-transitory computer readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A control device, comprising:
   an interface terminal;
   a configurable interface circuit having:
      an interface connection coupled to the interface terminal;
      a plurality of switches;
      a first plurality of configuration control inputs that collectively define a plurality of states, each of a plurality of interface signal types being associated with a respective one of the states, each configuration control input being coupled to at least one of the switches to control the activation of the at least one switch; and a plurality of components coupled to the switches, wherein the switches define a current one of a plurality of component arrangements based on a corresponding one of the plurality of interface signal types associated with a current one of the states, each component arrangement having the interface connection and at least one active component from among the plurality of components, wherein the components include a first resistor having a first end coupled to an output of the at least one active component and a second end coupled to the interface connection, and a first switch of the plurality of switches is coupled between a digital bias voltage and the second end of the first resistor.

2. A control device of claim 1, wherein the one active component has an output coupled to the interface connection.

3. A control device of claim 1, wherein the one active component is an amplifier.

4. A control device of claim 1, further comprising another configuration control input that is different than the first plurality of configuration control inputs, the other configuration control input being coupled between a first input of the active component and a signal generator.

5. A control device of claim 1, wherein when the first plurality of configuration control inputs identify a first state, the switches are controlled in accordance with the first state to define a first of the component arrangements that associates the interface connection with a first of the interface signal types, the first interface signal type identifying a first input type having a first analog voltage range.

6. A control device of claim 5, wherein the first resistor is coupled in series between the output of the active component and the interface connection, and the first component arrangement includes the first resistor such that the first resistor varies a voltage present on the interface connection in association with a resistive load connected to the interface terminal.

7. A control device of claim 6, further comprising another configuration control input that is different than the first plurality of configuration control inputs, wherein when the first plurality of configuration control inputs identifies the first state, the other configuration control input receives a first voltage from the signal generator that corresponds to a high end of the first analog voltage range.

8. A control device of claim 7, further comprising a second resistor coupled between the output of the active component and a second input of the active component, and a third resistor coupled between the second input of the active component and a first of the switches such that, when the first switch is deactivated, one end of the third resistor is decoupled so that the first component arrangement is inhibited from including the third resistor.

9. A control device of claim 5, wherein when the first plurality of configuration control inputs identify a second state, the switches are controlled in accordance with the second state to define a second of the component arrangements that associates the interface connection with a second of the interface signal types, the second interface signal type identifying a second input type having a second analog voltage range, the second analog voltage range having a high end that is greater than a high end of the first analog voltage range.

10. A control device of claim 9, further comprising another configuration control input that is different than the first plurality of configuration control inputs, wherein when the first plurality of configuration control inputs identifies the second state, the other configuration control input receives a second voltage from the signal generator that corresponds to a low end of the second analog voltage range.

11. A control device of claim 10, further comprising a third resistor coupled between the second input of the active component and a first of the switches, wherein the second component arrangement includes the first resistor such that, when the second voltage is present on the first input of the active component and the one end of the third resistor is decoupled, the active component generates an output signal corresponding to the second voltage that enables the first resistor to vary a voltage present on the interface terminal to be within the second analog voltage range.

12. A control device of claim 1, wherein when the first plurality of configuration control inputs identify a third state, the switches are controlled in accordance with the third state to define a third of the component arrangements that associates the interface connection with a third of the interface signal types, the third interface signal type identifying a third input type reflecting a digital input.

13. A control device of claim 12,
wherein the second switch is activated when the configuration control inputs identify the third state.

14. A control device of claim 13, wherein:
a third switch of the plurality of switches has an activation input connected to one of the configuration control inputs that is active high during the third state such that the third switch is activated during the third state to bias the second switch to be activated when the third switch is activated.

15. A control device of claim 12, wherein the components include:
a second resistor coupled between the output of the active component and a second input of the active component, and
a seventh resistor coupled between the output of the active component and a second of the switches such that, when the second switch is activated, the seventh resistor and second resistor define an digital gain ratio for the active component.

16. A control device of claim 15, wherein the components include:
the first resistor having a first end coupled to the output of the active component and a second end coupled to the interface connection, and
an eighth resistor having a first end coupled to a third of the switches and a second end coupled to the interface connection,
the third switch having an activation input connected to one of the configuration control inputs that is active high during the third state such that the first resistor and the second resistor are connected in parallel when the third switch is activated.

17. A control device of claim 1, wherein when the first plurality of configuration control inputs identify a fourth state, the switches are controlled in accordance with the fourth state to define a fourth of the component arrangements that associates the interface connection with a fourth of the interface signal types, the fourth interface signal type identifying a first output type.

18. A control device of claim 17, further comprising another configuration control input that is different than the first plurality of configuration control inputs, wherein when the first plurality of configuration control inputs identifies the fourth state, the other configuration control input receives a pulse width modulated signal from the signal generator, the pulse width modulation signal having an amplitude that varies from a first voltage and a second voltage.

19. A control device of claim 18, further comprising:
a second resistor coupled between the output of the active component and a second input of the active component, and
a third resistor coupled between the output of the active component and a first of the switches such that, when the first switch is activated, the second resistor and third resistor define an output gain ratio for the active component.

20. A control device of claim 19, wherein the first switch is activated when the pulse width modulated signal has an amplitude corresponding to the first voltage.

21. A control device of claim 20, further comprising:
a fourth resistor coupled between the first input of the active component and the other configuration control input; and
a capacitor having one end connected to the first input of the active component and another end, wherein the fourth resistor and the capacitor form a low pass filter.

22. A control device of claim 21, wherein the low pass filter rectifies a duty cycle of the pulse width modulated signal to present a D.C. voltage on the first input of the active component that is a percentage of the first voltage.

23. A control device of claim 1 further comprising an input amplifier having an input coupled to the interface connection for receiving an input signal or for receiving a feedback signal based on the state identified by the plurality of configuration control inputs.

24. A control device of claim 23, further comprising a fifth resistor coupled between the input of the input amplifier and a fourth of the switches, wherein the fourth switch is activated when the plurality of configuration control inputs identifies one of a second state or a fourth state.

25. A control device of claim 23, further comprising a sixth resistor coupled between the input of the input amplifier and a fifth of the switches, wherein the fifth switch is activated when the plurality of configuration control inputs identifies a third state.

* * * * *